(No Model.)
G. E. CRUTCHFIELD.
WHEEL.
No. 402,723. Patented May 7, 1889.
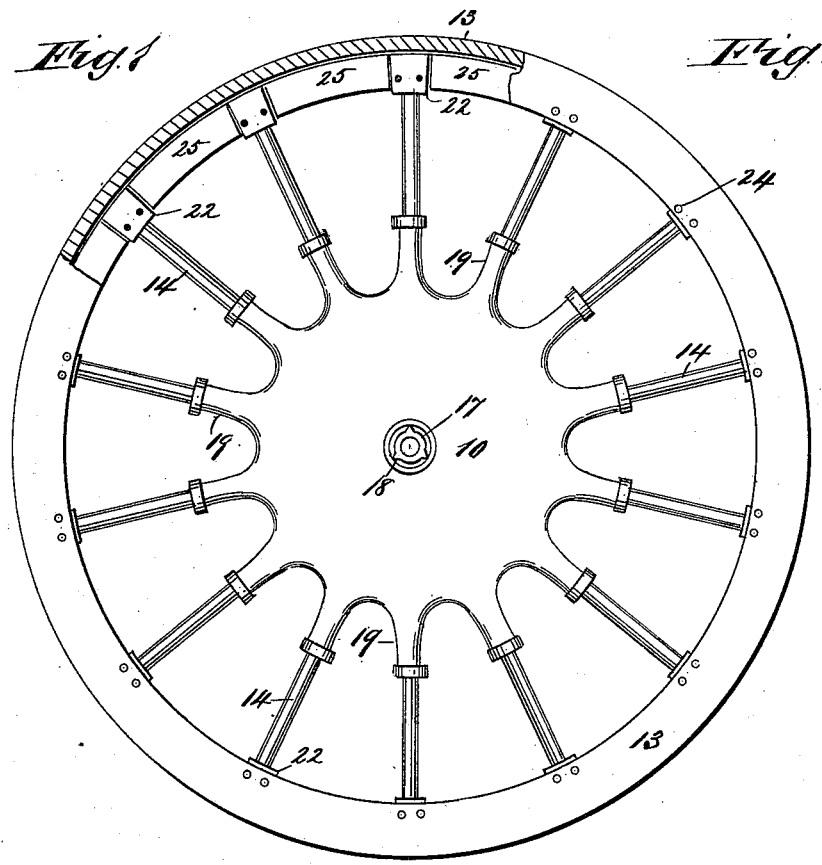
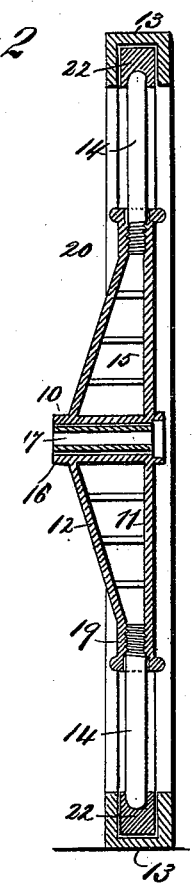
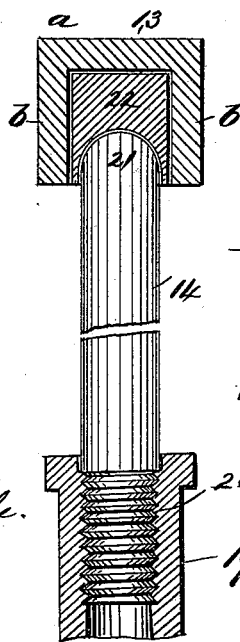
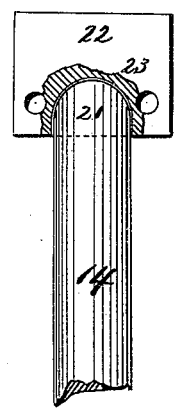
WITNESSES:
F. McArdle.
C. Sedgwick.
INVENTOR:
G. E. Crutchfield
BY Munn &Co.
ATTORNEYS.

UNITED STATES PATENT OFFICE.

GEORGE E. CRUTCHFIELD, OF ENGLISH, ARKANSAS.

WHEEL.

SPECIFICATION forming part of Letters Patent No. 402,723, dated May 7, 1889.

Application filed January 9, 1889. Serial No. 295,834. (No model.)

*To all whom it may concern:*

Be it known that I, GEORGE E. CRUTCHFIELD, of English, in the county of Arkansas and State of Arkansas, have invented a new and useful Improvement in Wheels, of which the following is a full, clear, and exact description.

My invention relates to an improvement in wheels, and has for its object to simplify the construction of the same, and to provide a wheel of superior strength, wherein the hub will extend to within a short distance of the felly, and wherein the spokes will necessarily be short; and a further object of the invention is to provide a simple, efficient, and readily-secured box for the said wheel, and to so construct the tire as that the same will serve the purposes of both the tire and the felly.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of the wheel with the tire partly in section. Fig. 2 is a central diametrical section of Fig. 1. Fig. 3 is a detail view, and illustrates the mode of securing the outer ends of the spokes. Fig. 4 is a transverse section through the tire and a portion of the hub, illustrating the attachment of the spokes to the said tire and hub; and Fig. 5 is a perspective detail view of the hub-box.

In carrying out the invention the hub 10 is constructed, preferably, of malleable iron, and is so shaped that in diametrical section it will represent the frustum of a flattened cone, the straight surface 11 being the inner face and the inclined surface 12 being the outer face. The hub may be of any desired weight or size, but is preferably of a size to extend within a short distance of the tire 13, whereby short spokes 14 may be employed, the length of said spokes being, preferably, not quite a quarter of the diameter of the wheel.

The hub 10 is essentially tubular, and ordinarily strengthened through the medium of a series of brace-rods, 15, which braces 15 are integral with the inner walls of the hub, as best illustrated in Fig. 2.

The hub 10 is provided with the usual bore, 16, adapted for the reception of a spindle-box, 17. The walls of the bore 16 are, however, provided with a series of longitudinal grooves, into which the V-shaped longitudinal projections 18 of the box 17 are adapted to enter. The projections or lugs are cast integral with the outer face of the box, and are preferably made to extend from end to end of the same, as best illustrated in Fig. 5.

The box 17 is made of cast-steel and shrunk into the hub in any approved manner.

From the periphery of the hub 10 a series of interiorly-threaded spaced sockets, 19, are projected, into each of which one end of a spoke, 14, is secured in a manner hereinafter set forth. The said spokes are tubular and are provided at one end with an exterior thread, 20, the other end being made convex or circular, as best illustrated at 21 in Figs. 3 and 4.

The tire 13 is box shape in cross-section and open upon the inner face, the said tire consisting of a flat outer bearing-surface, A, and sides *b*, extending at a right angle to the bearing-surface and inward, as best illustrated in Figs. 2 and 4. By this construction I obtain a hollow tire approximately rectangular in cross-section and open upon its inner face.

A retaining-block, 22, is provided for each spoke, having a circular cavity, 23, produced in the inner face, adapted to receive the circular or convex end of the spoke, as best shown in Fig. 3.

The blocks 22 are introduced into the tire, and are made to fit in between the two side walls of the latter, being retained in position by means of rivets 24 or bolts passing through the tire and through the blocks. The blocks 22 are ordinarily made about as long as twice the diameter of the spoke and thick enough to fill up the space in the tire between the walls thereof.

The threaded ends 20 of the spokes are introduced into the several sockets 19, and since the spokes are tubular and the thread upon the outer surfaces of the said spokes naturally tend to weaken them I guard against this weakness to some extent by inserting the inner end of the spoke into the socket a sufficient distance to receive a portion of the unthreaded surface, as best illustrated in Fig. 4.

It will be observed that I do not depend upon a felly in the construction of the wheel, as heretofore, as I make the tire serve the dual purpose of a felly and a tire.

To fill up the spaces between the several blocks 22, a false felly, 25, is introduced into the tire, consisting of segmental blocks of wood or other material. The false felly is not intended to add strength to the tire, but merely to fill up the channel therein and to exclude the mud and dirt which would otherwise fill the said channel.

Having thus described my invention, what I claim as new, and desire to secure by Letters Patent, is—

1. A wheel comprising a hub, spokes radiating therefrom, a hollow tire open on its inner side, retaining-blocks 22 therein and with which the outer ends of the spokes are engaged, and the spacing and filling blocks 25 between the blocks 22, substantially as set forth.

2. The hollow hub 10, approximately in the form of a frustum of a cone and formed with integral screw-threaded spoke-sockets 19 and a central bore, 16, having longitudinal grooves, substantially as set forth.

3. The combination, with an essentially tubular interiorly-braced metal hub and sockets projected from the periphery of said hub, of a hollow tire approximately rectangular in cross-section and open upon its inner face, blocks held within the channel of the tire, and spokes introduced into the said sockets and extending within the said blocks, substantially as shown and described.

4. The combination, with a metal hub and sockets projected from the periphery of the same, of a hollow tire approximately rectangular in cross-section and open upon its inner face, blocks held within the channel of the tire and provided with a cavity in the inner end, and spokes having one end introduced into the cavity of the block and the other end secured in the sockets of the hub, substantially as and for the purpose specified.

5. The combination, with a metal hub and a series of sockets projecting from the periphery of the same, of a hollow tire approximately rectangular in cross-section and open upon its inner face, blocks secured within the channel of the tire having a cavity in the inner end, spokes introduced into the cavity of the said blocks and into the sockets of the hub, and false segmental felly-blocks intervening each of the spoke-blocks, all combined for operation substantially as shown and described.

6. In a wheel, the combination, with a hollow metal hub representing in diametrical section the frustum of a flattened cone and provided with a series of radially-projecting screw-threaded spoke-sockets, and a central bore with a series of longitudinal grooves produced in the walls of the said bore, of a box provided with longitudinal ribs or lugs adapted to be shrunk in the bore of the hub, substantially as and for the purpose specified.

7. In a wheel, the combination, with an essentially-tubular iron hub representing in diametrical section the frustum of a flattened cone and provided with a series of internal integral braces and a central bore having longitudinal grooves produced in the walls thereof, of a steel box provided with longitudinal lugs or ribs upon its outer face, which box is adapted to be secured in the bore of the hub, substantially as and for the purpose specified.

GEORGE E. CRUTCHFIELD.

Witnesses:
THOS. J. STOKES,
JOHN Q. MARTIN.